United States Patent
Wang et al.

(10) Patent No.: US 9,880,861 B2
(45) Date of Patent: Jan. 30, 2018

(54) METHOD AND APPARATUS FOR PAGE VIEW SWITCHING

(71) Applicant: TENCENT TECHNOLOGY (SHENZHEN) COMPANY LIMITED, Shenzhen (CN)

(72) Inventors: Yulong Wang, Shenzhen (CN); Hongjian Cui, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 740 days.

(21) Appl. No.: 14/256,928

(22) Filed: Apr. 19, 2014

(65) Prior Publication Data
US 2014/0365960 A1    Dec. 11, 2014

Related U.S. Application Data

(63) Continuation of application No. PCT/CN2013/090237, filed on Dec. 23, 2013.

(30) Foreign Application Priority Data

Jun. 5, 2013 (CN) .......................... 2013 1 0222341

(51) Int. Cl.
G06F 3/0481     (2013.01)
G06F 9/44       (2006.01)

(52) U.S. Cl.
CPC .......... *G06F 9/4443* (2013.01); *G06F 3/0481* (2013.01)

(58) Field of Classification Search
CPC ................................................... G06F 9/4443
See application file for complete search history.

(56) References Cited

U.S. PATENT DOCUMENTS 6,026,474 A  *  2/2000  Carter ................... G06F 9/5016
                                                 707/999.01
8,667,421 B2 *  3/2014  Grunberger ............. G06F 17/24
                                                    715/853
(Continued)

FOREIGN PATENT DOCUMENTS

CN     101184300 A    5/2008
CN     101714088 A    5/2010
CN     101923425 A    12/2010

OTHER PUBLICATIONS

The World Intellectual Property Organization (WIPO) International Search Report for PCT/CN2013/090237 dated Mar. 27, 2014.

(Continued)

*Primary Examiner* — Nicholas Klicos
(74) *Attorney, Agent, or Firm* — Anova Law Group, PLLC

(57) ABSTRACT

A method for page view switching is provided. The method includes detecting a view switching operation in an application interface by a user to switch from a current view to a target view. The method also includes destroying the current view corresponding to the view switching operation and creating a view object corresponding to the target view in the view switching operation by calling a view controller class. Further, the method includes assigning values to the view object through a view controller and displaying the view object with the assigned values on the application interface to display the target view to the user.

19 Claims, 5 Drawing Sheets

(56) References Cited

U.S. PATENT DOCUMENTS

| | | | | |
|---|---|---|---|---|
| 2004/0003351 A1* | 1/2004 | Sommerer | ........ | G06F 17/30876 |
| | | | | 715/251 |
| 2004/0059746 A1* | 3/2004 | Error | ..................... | G06F 11/323 |
| 2005/0257400 A1* | 11/2005 | Sommerer | ........ | G06F 17/30873 |
| | | | | 36/13 |
| 2006/0070012 A1* | 3/2006 | Milener | ................ | G06F 3/0482 |
| | | | | 715/822 |
| 2006/0074984 A1* | 4/2006 | Milener | ............ | G06F 17/30876 |
| 2006/0101341 A1* | 5/2006 | Kelly | ................ | G06F 17/30899 |
| | | | | 715/738 |
| 2011/0055683 A1* | 3/2011 | Jiang | ................ | G06F 17/30899 |
| | | | | 715/234 |
| 2011/0231482 A1* | 9/2011 | Benna | ................ | G06F 17/30867 |
| | | | | 709/203 |
| 2011/0258528 A1* | 10/2011 | Roper | ............... | G06F 17/30905 |
| | | | | 715/234 |
| 2012/0036456 A1* | 2/2012 | Grunberger | ......... | G06F 3/04815 |
| | | | | 715/760 |
| 2014/0337458 A1* | 11/2014 | Barton | ................ | H04L 67/2847 |
| | | | | 709/213 |

OTHER PUBLICATIONS

The State Intellectual Property Office of the People's Republic of China (SIPO) Office Action 1 for 201310222341.9 dated Aug. 14, 2017 pp. 1-8.

\* cited by examiner

METHOD AND APPARATUS FOR PAGE VIEW SWITCHING

CROSS-REFERENCES TO RELATED APPLICATIONS

This application is a continuation application of PCT Patent Application No. PCT/CN2013/090237, filed on Dec. 23, 2013, which claims priority of Chinese Patent Application No. 201310222341.9, filed on Jun. 5, 2013, the entire contents of all of which are incorporated by reference herein.

FIELD OF THE INVENTION

The present invention generally relates to graphics application technologies and, more particularly, to methods and apparatuses for page view switching.

BACKGROUND

Applications run on electronic devices and implement various functions through views displayed on the screens of the electronic devices or graphical interfaces for users to trigger operation events. The running applications often hold various views simultaneously. Based on a user's switching operation, what displayed on the display screen can be jumped from a current view to another corresponding view. Also, based on the switching operation triggered again by the user, the view displayed can be jumped back to the current view.

The views held simultaneously by the running applications correspond to various view objects, respectively. That is, each view corresponds to a view object. Therefore, for the application that opens multiple views at the same time, there are multiple view objects stored in the memory of the electronic devices, consuming excessive memory resources.

The disclosed method and apparatus are directed to solve one or more problems set forth above and other problems.

BRIEF SUMMARY OF THE DISCLOSURE

One aspect of the present disclosure includes a method for page view switching. The method includes detecting a view switching operation in an application interface by a user to switch from a current view to a target view. The method also includes destroying the current view corresponding to the view switching operation and creating a view object corresponding to the target view in the view switching operation by calling a view controller class. Further, the method includes assigning values to the view object through a view controller and displaying the view object with the assigned values on the application interface to display the target view to the user.

Another aspect of the present disclosure includes an apparatus for page view switching. The apparatus includes a detecting module configured to detect a view switching operation in an application interface by a user to switch from a current view to a target view and a current view processing module configured to destroy the current view corresponding to the view switching operation. The apparatus also includes an object creation module configured to create a new view object corresponding to the target view in the view switching operation by calling a view controller class. Further, the apparatus includes a display control module configured to assign values to the view object through a view controller and display view object with the assigned values on the application interface to display the target view to the user.

Other aspects of the present disclosure can be understood by those skilled in the art in light of the description, the claims, and the drawings of the present disclosure.

BRIEF DESCRIPTION OF THE DRAWINGS

In order to more clearly illustrate technical solutions of the present disclosure, the figures which are needed to be used in the description of the present disclosure or the existing technology are briefly described in the following. Obviously, the figures in the following description are only some embodiments of the present disclosure, and it is easily for those skilled in the art to obtain other figures based on the following figures without creative work.

DETAILED DESCRIPTION

Reference will now be made in detail to exemplary embodiments of the disclosure, which are illustrated in the accompanying drawings.

Figure 9:
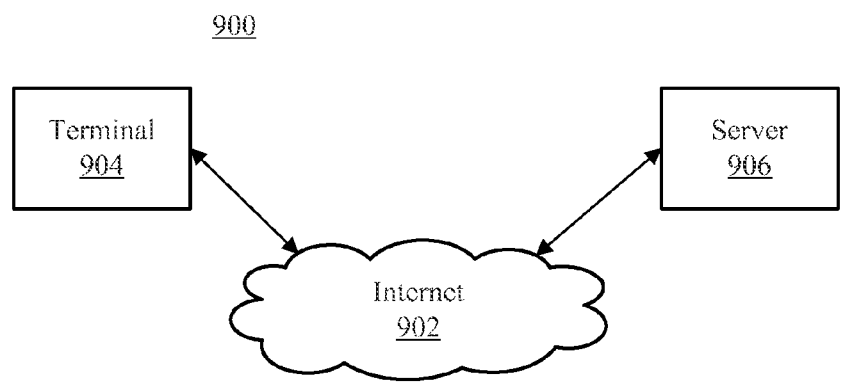
FIG. 9 shows an environment incorporating certain aspects of the present invention.

FIG. 9 shows an environment incorporating certain aspects of the present invention. As shown in FIG. 9, environment 900 may include a terminal 904, a server 906, and the Internet 902. The terminal 904 may access the server 906 through the Internet 902 for certain personalized services provided by the server 906. Although only one server 906 and one terminal 904 is shown in the environment 900, any number of terminals 904 or servers 906 may be included, and other devices may also be included.

The Internet 902 may include any appropriate type of communication network for providing network connections to the terminal 904 and server 906 or among multiple terminals 904 and servers 906. For example, Internet 902 may include the Internet or other types of computer networks or telecommunication networks, either wired or wireless.

A terminal, as used herein, may refer to any appropriate user terminal with certain computing capabilities, such as a personal computer (PC), a work station computer, a server computer, a hand-held computing device (tablet), a smart phone or mobile phone, or any other user-side computing device. In certain embodiments, terminal 904 may be a wireless terminal, such as a smart phone, a tablet computer, or a mobile phone, etc. Terminal 904 may be implemented on any appropriate computing platform.

A server, as used herein, may refer one or more server computers configured to provide certain web server functionalities. A server may also include one or more processors to execute computer programs in parallel.

Figure 10:
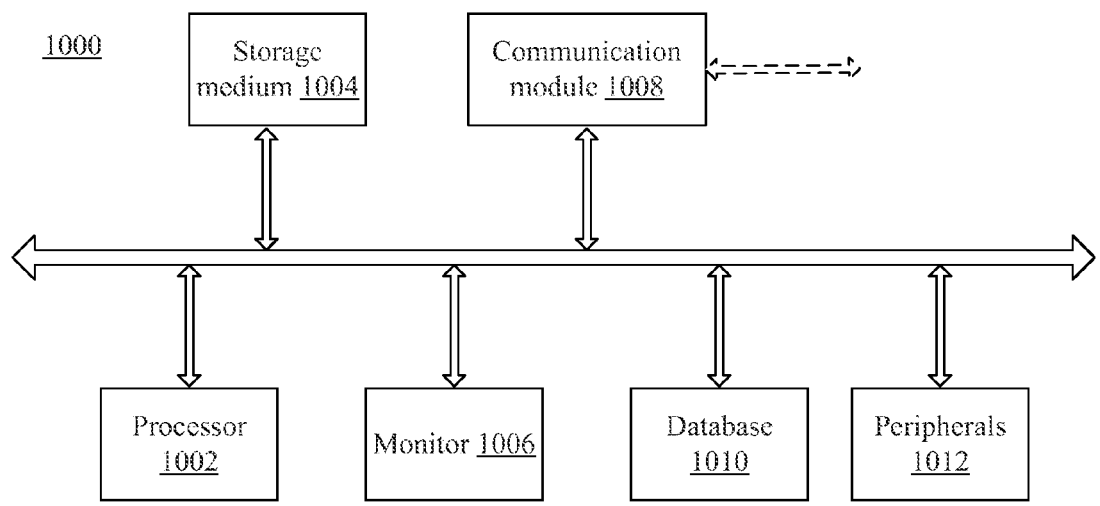
FIG. 10 shows a block diagram of an exemplary computer system capable of implementing the system for view switching.

FIG. 10 shows a block diagram of an exemplary computer system 1000 capable of implementing the terminal 904 and/or the server 906.

As shown in FIG. 10, computer system 1000 may include a processor 1002, a storage medium 1004, a monitor 1006, a communication module 1008, a database 1010, and peripherals 1012. Certain devices may be omitted and other devices may be included.

Processor 1002 may include any appropriate processor or processors. Further, processor 1002 can include multiple cores for multi-thread or parallel processing. Storage medium 1004 may include memory modules, such as ROM, RAM, flash memory modules, and erasable and rewritable memory, and mass storages, such as CD-ROM, U-disk, and hard disk, etc. Storage medium 1004 may store computer programs for implementing various processes, when executed by processor 1002.

Further, peripherals 1012 may include I/O devices such as keyboard and mouse, and communication module 1008 may include network devices for establishing connections through the communication network. Database 1010 may include one or more databases for storing certain data and for performing certain operations on the stored data, such as database searching.

Figure 1:
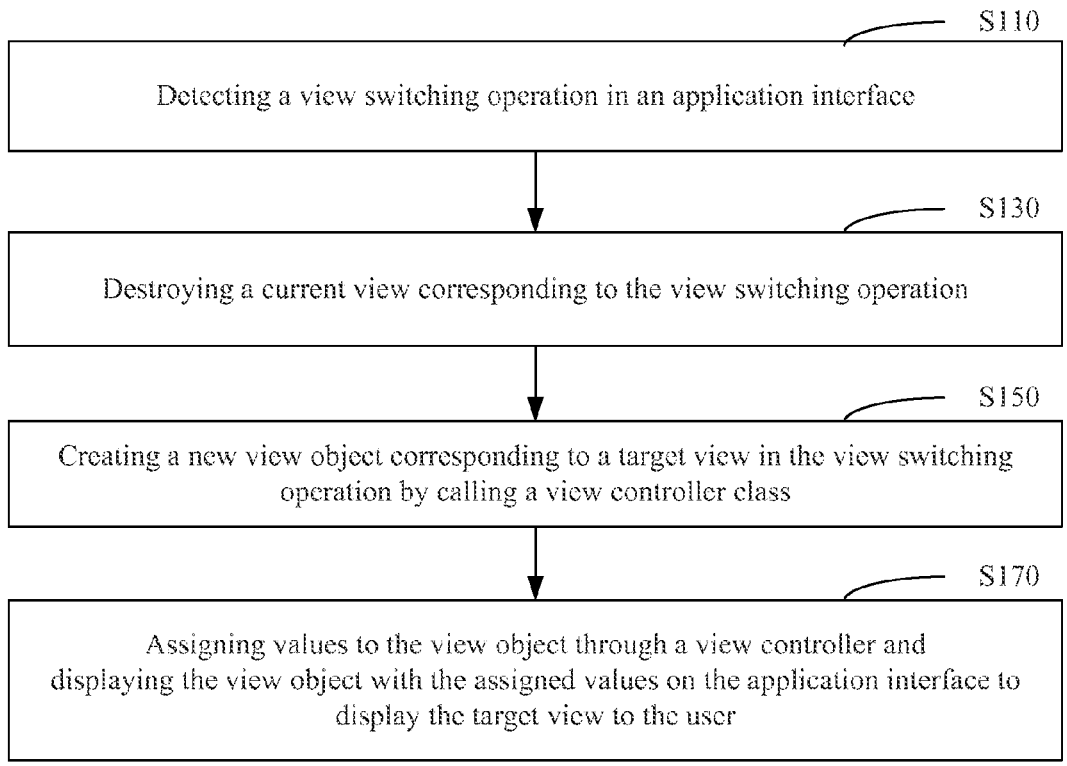
FIG. 1 illustrates a flow chart of an exemplary view switching process consistent with the disclosed embodiments.

In operation, computer system 1000 may run a web browser or other applications and perform certain functions for view switching. That is, when the web browser or other applications are running on terminal 904, multiple pages (page views or views) may be generated. Based on a user's view switching operation, the display on the terminal 904 may be switched among different views, and certain operations may also be triggered by the view switching. FIG. 1 illustrates a flow chart of an exemplary view switching process consistent with the disclosed embodiments. As shown in FIG. 1, the process may include the following steps.

S110: detecting a view switching operation in an application interface.

A running application may open at least two views, and any one of two views is displayed on the application interface of the running application. Detecting the view switching operation is an operation triggered by a user's action to check a view that is not currently displayed through the application interface.

Specifically, the detecting operation may include: detecting whether the application interface is triggered and, after detecting that the application interface is triggered, determining whether the current operation that triggers the application interface is a view switching operation.

S130: a current view corresponding to the view switching operation is destroyed.

For example, the current view displayed on the application interface is destroyed by a view controller class. The view object corresponding to the current view can also be destroyed, and the view object does not remain in the memory.

S150: a new view object corresponding to a target view in the view switching operation is created by calling the view controller class.

The view controller class is used to control creation and destroying of view objects. The target view that the user expects to switch to is obtained from the view switching operation that triggers the application interface. Then, the view object corresponding to the target view is created by calling the view controller class.

S170: the view object is assigned a value by a view controller, and the view object with assigned value is displayed on the application interface to display the target view.

The view controller controls the display of the target view on the application interface, obtains the data corresponding to the created view object, and assigns the created view object its value, so that the target view is displayed on the application interface.

The data with the assigned values to the view object can be used to indicate relationships among different views and hierarchical relationships in a corresponding view, the contents and pictures of the view, and so on. By assigning values to the target view object, the target view can be drawn and then the target view can be displayed.

Further, a view controller can control one or more view objects. That is, after the view switching operation is triggered, a new target view is loaded to replace the current view on the display interface. At this time, a new view controller can be created to control the view object corresponding to the loaded target view, or the current view controller can also be used to control the view object.

However, in order to avoid increasing the amount of code in the current view controller and avoid damaging the structure of the view controller, in certain embodiments, a new view controller is created to assign values to the view object corresponding to the loaded target view and to display the target view.

In the above page view switching process, the view object is dynamically created by the view controller class. The view controller only needs to control the display of the view object, thus avoiding implementing complex logic associated with the view object in the view controller. That is, the view controller only needs to assign values to the created view object, and the view is displayed through the view object assigned with values, so that a variety of logic processing events can be responded, further avoiding confusion caused by switching views and reducing resource consumption. Also, the structure of the view controller is simplified and the amount of code is decreased.

Figure 2:
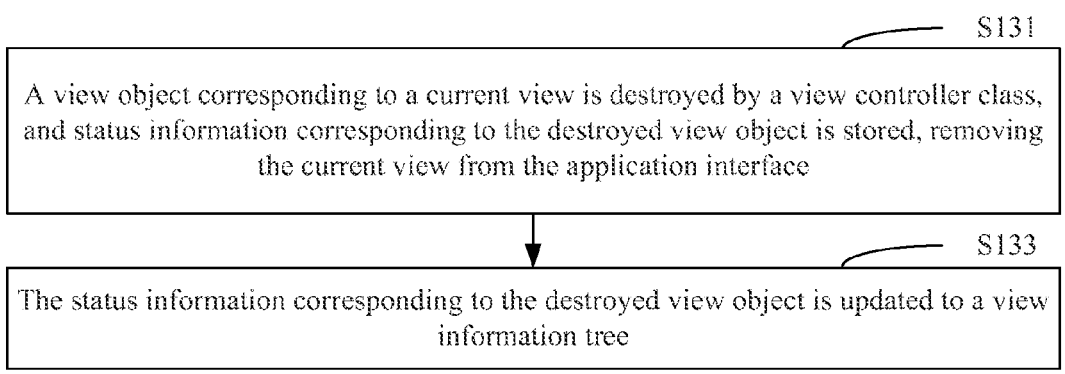
FIG. 2 illustrates a flow chart of an exemplary process for destroying a current view corresponding to a view switching operation consistent with the disclosed embodiments.

FIG. 2 illustrates a flow chart of an exemplary process for destroying a current view corresponding to a view switching operation consistent with the disclosed embodiments. As shown in FIG. 2, S130 may include the following steps.

S131: a view object corresponding to a current view is destroyed by a view controller class, and status information corresponding to the destroyed view object is stored, removing the current view from an application interface.

The status information corresponding to the view object of the current view is obtained through the view controller class. Further, when the view object of the current view is destroyed, the obtained status information is stored. The status information corresponding to the view object is used to indicate the display status of the current view in the application interface. For example, the status information corresponding to the view object includes the lateral offset and vertical offset of the current view, display status of various controls in the current view, and so on.

During the subsequent view switching process, when a user wants to jump back to the current view, the display status before switching can be restored through the stored status information corresponding to the view object of the current view. Therefore, the user may continue to see the current view smoothly, reducing the initialization process of the view and improving the view switching speed.

S133: the status information corresponding to the destroyed view object is updated to a view information tree.

The view information tree is a multi-way tree constructed based on the data corresponding to the views in the application interface, where every leaf node of the view information tree correspondingly stores the status information corresponding to a view.

The status information of the destroyed view object is updated to the view information tree. During the view switching process, even if the view object corresponding to the view to be opened is not stored in the memory, the application/user can still jump back to the current view that he/she has left previously, achieving quickly jumping back and forth among the views. That is, the user jumps back to the interface corresponding to the previous view again. Therefore, the user does not need to manually search all opened views stored in the memory to locate the view to switch to again. The view switching method not only effectively reduces the memory consumption and improves application performance, but also speeds up the view switching speed.

Figure 3:
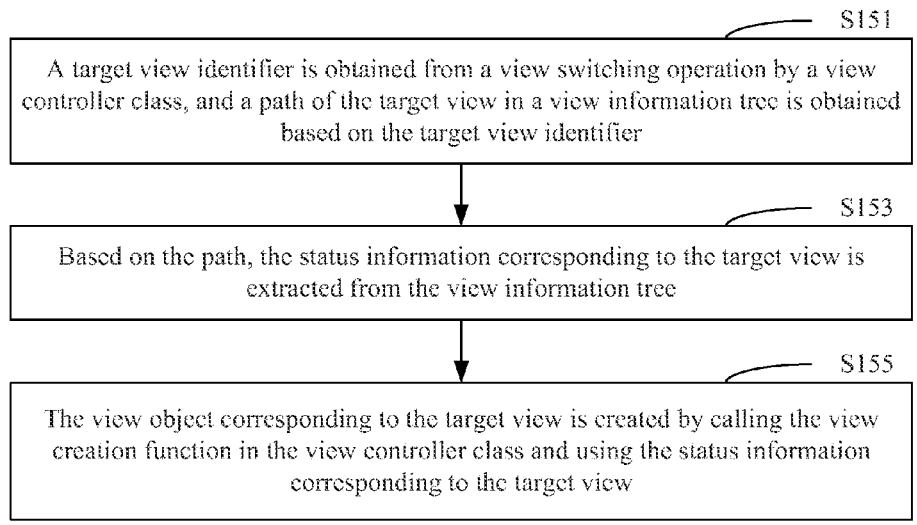
FIG. 3 illustrates a flow chart of an exemplary process for creating a view object corresponding to a target view in a view switching operation by calling a view controller class consistent with the disclosed embodiments.

FIG. 3 illustrates a flow chart of an exemplary process for creating a view object corresponding to a target view in a view switching operation by calling a view controller class consistent with the disclosed embodiments. As shown in FIG. 3, S150 may include the following steps.

S151: a target view identifier is obtained from a view switching operation by a view controller class, and a path of the target view in a view information tree is obtained based on the target view identifier.

After a view switching operation is triggered in an application interface, the corresponding response interface (i.e., the view controller class) is called. The target view identification is obtained from a view switching operation by the view controller class and, based on the target view identifier, a path of the status information corresponding to the target view is obtained in a view information tree. A leaf node in the view information tree for storing the data corresponding to the target view can be obtained through the path.

Specifically, the view information tree includes a plurality of leaf nodes. Each leaf node corresponds to a view opened in the application interface, and each leaf node stores the status information corresponding to the view. The status information is used to indicate the display status of the corresponding view in the application interface. Each node of the view information tree has a corresponding indicator. The higher level indicator and the lower level indicator together may construct the path from the root node to the corresponding leaf node.

After the target view identifier is obtained from the view switching operation by the view controller class, an indicator of the view information tree is opened, and then the branch path indicated by the indicator is obtained.

S153: based on the path, the status information corresponding to the target view is extracted from the view information tree.

Specifically, according to the obtained path, the leaf node of the view information tree corresponding to the target view is obtained. Then, the status information corresponding to the target view is extracted from the obtained leaf node. The status information includes display status of the view object corresponding to the target view.

S155: the view object corresponding to the target view is created by calling the view creation function in the view controller class and using the status information corresponding to the target view.

Because the view switching operation is triggered, the corresponding view object needs to be dynamically created for the view switching operation triggered on the application interface, where the view object corresponds to the target view of the view switching operation.

The view creation function in the view controller class is called and the status information corresponding to the target view is used as an input of the view creation function to dynamically create the view object.

Figure 4:
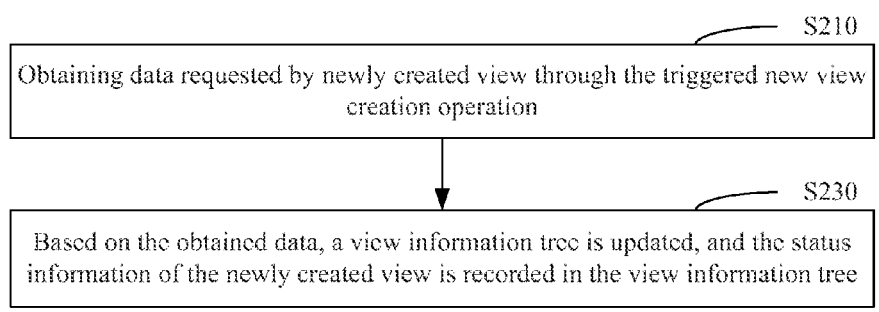
FIG. 4 illustrates a flow chart of another exemplary view switching process consistent with the disclosed embodiments.

FIG. 4 illustrates a flow chart of another exemplary view switching process consistent with the disclosed embodiments. As shown in FIG. 4, before implementing S110, the view switching process may also include the following steps.

S210: obtaining data requested by newly created view through the triggered new view creation operation.

When an application is triggered to create a new view, a data request is initiated by triggered creating new view operation to obtain the requested data.

Specifically, the requested data is the backend data corresponding to the application, that is, the data issued by a server that interacts with the application. For example, if an application is a browser running on the electronic device, the view switching in the browser is switching between a plurality of webpages opened by the browser. At this time, the triggered operation that creates a new view is an operation that opens a new webpage in the browser. A request is initiated and sent to the corresponding backend server to obtain data returned from the backend server. The obtained data is related to the webpage to be opened.

S230: based on the obtained data, a view information tree is updated, and status information of the newly created view is recorded in the view information tree.

Based on the obtained data, the next higher level node (i.e., father node) of the leaf node corresponding to this newly created view can be obtained. Based on the obtained data, the view information tree is updated to construct a new branch. Then, the leaf node of the newly created view is set at the newly constructed branch, and the status information of the newly created view is recorded in the new leaf node.

At this time, when the new view is switched to from the current view through the view switching operation of the application interface, the newly created view object is returned to a caller. The caller can be a view controller. The location and level of display of the view object is further configured by the view controller. Thus, the corresponding view is displayed after receiving the view switching operation in the application interface from the user.

In one embodiment, the above view information tree is dynamically constructed with view switching in the application interface.

In certain embodiments, this view information tree is constructed when the application interface opens a view at the first time. A new branch is dynamically constructed when a new view is created. An indicator of the path pointing to the corresponding leaf node is closed when the view is closed.

Thus, each new branch of the view information tree is constructed at different time. The branch is constructed only when the view on the branch needs to be displayed. Therefore, the view information tree is dynamically expanded based on the actual needs.

Figure 11:
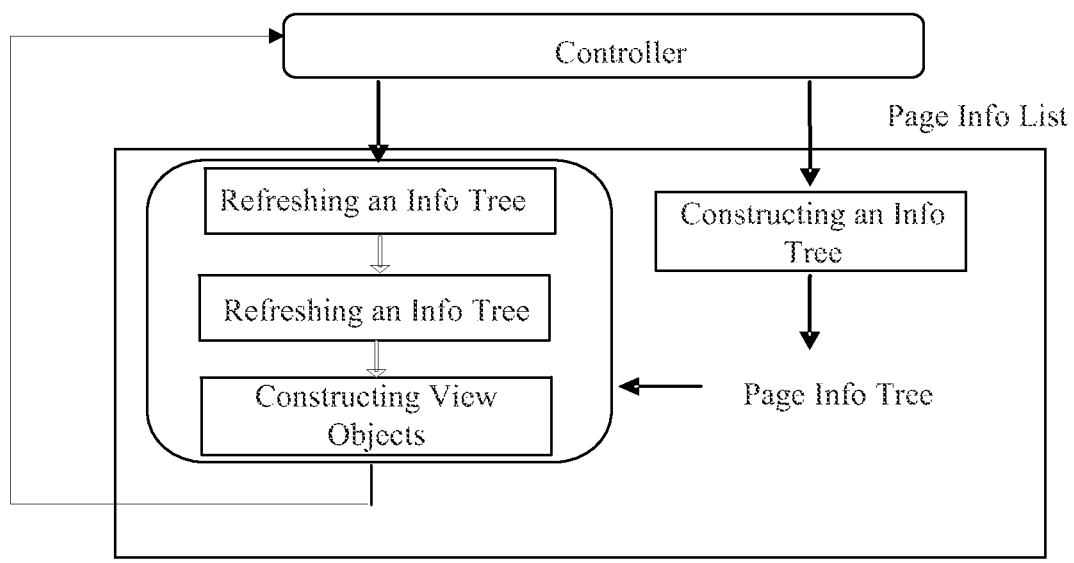
FIG. 11 illustrates a flow chart of an exemplary view object constructing process consistent with the disclosed embodiments.

FIG. 11 illustrates a flow chart of an exemplary view object constructing process consistent with the disclosed embodiments. As shown in FIG. 11, according to a page information list sent from a backend server, a view controller class is used to dynamically refresh a page information tree using a singleton pattern. The singleton pattern is a design pattern that restricts the instantiation of a class to one object. This is useful when exactly one object is needed to coordinate actions across the system.

The page information tree is a multi-way tree constructed based on the page information list sent from the backend server, where leaf nodes of the page information tree store the construction information of the list view. A node that does not have any son is called a leaf node. The page information tree is hierarchical structure made of nodes with father-son relations. A father page node (also named fPage) is the next higher level node of a son page node (also named sPage). Each node of the page information tree has a corresponding indicator that is used to indicate a path from a root node to a current view information node.

In the traditional design pattern, a view controller object (or, simply, a view controller) acts as a coordinator or as an intermediary between one or more view objects. The view controller interprets user actions and intentions made in view objects (e.g., switching page views). Therefore, complex logic associated with the view objects needs to be implemented by the view controller in the traditional design pattern.

As used herein, view objects may be dynamically created by the view controller class. The status of the view objects may also be dynamically stored by the view controller class.

Further, all view objects are created and destroyed by the view controller class. That is, an interface of the view controller class is called to create a view container object and update the status of the view objects.

Therefore, the view controller only needs to control the display of the view objects, thus avoiding implementing complex logic associated with the view object in the view controller.

Figure 5:
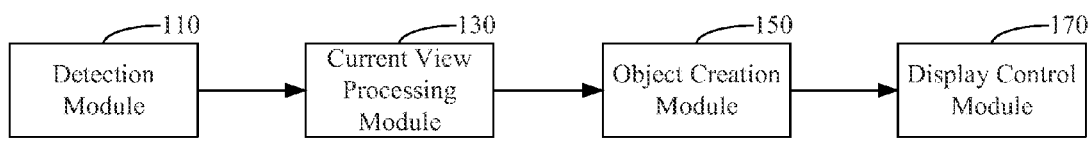
FIG. 5 illustrates a structure diagram of an exemplary apparatus for view switching consistent with the disclosed embodiments.

FIG. 5 illustrates a structure diagram of an exemplary apparatus for view switching consistent with the disclosed embodiments. As shown in FIG. 5, the apparatus may include a detecting module 110, a current view processing module 130, an object creation module 150 and a display control module 170.

The detecting module 110 is configured to detect a view switching operation in an application interface by a user to switch from a current view to a target view.

A running application may open at least two views, and any one of two views is displayed on the application interface of the running application. Detecting the view switching operation obtained by the detecting module 110 is an operation triggered by a user's action to check a view that is not currently displayed through the application interface.

Specifically, the detecting module 110 detects whether the application interface is triggered and, after detecting that the application interface is triggered, the detecting module 110 determines whether the current operation that triggers the application interface is a view switching operation.

The current view processing module 130 is configured to destroy the current view corresponding to the view switching operation.

The current view processing module 130 destroys the current view displayed on the application interface by the view controller class. The view object corresponding to the current view can also be destroyed, and the view object does not remain in the memory.

The object creation module 150 is configured to create a view object corresponding to the target view in the view switching operation by calling a view controller class.

The view controller class is used to control the creation and destruction of the view object. The object creation module 150 obtains the target view that the user expects to switch to by triggering the view switching operation on the application interface. Then, the view object is created by calling the view controller class.

The display control module 170 is configured to assign values to the view object through a view controller and display the view object with the assigned values on the application interface to display the target view to the user.

The display control module 170 controls the display of the target view on the application interface through the view controller, obtains the data corresponding to the created view object, and assigns the created view object its value, so that the target view is displayed on the application interface.

The data with the assigned values to the view object can be used to indicate relationships among different views and hierarchical relationships in a corresponding view, the contents and pictures of the view, and so on. By assigning values to the target view object, the target view can be drawn and then the target view can be displayed.

Further, a view controller can control one or more view objects. That is, after the view switching operation is triggered, the display control module 170 loads a new target view to replace the current view on the display interface. At this time, a new view controller can be created to control the view object corresponding to the loaded target view, or the current view controller can also be used to control the view object.

However, in order to avoid increasing the amount of code in the current view controller and avoid damaging the structure of the view controller, in certain embodiments, the display control module 170 creates a new view controller to assign values to the view object corresponding to the loaded target view and to display the target view.

In the above view switching process, the view object is dynamically created by the view controller class. The view controller only needs to control the display of the view object, thus avoiding implementing complex logic associated with the view object in the view controller. That is, the view controller only needs to assign values to the created view object, and the view is displayed through the view object assigned with values, so that a variety of logic processing events can be responded, further avoiding confusion caused by switching views and reducing resource consumption. Also, the structure of the view controller is simplified and the amount of code is decreased.

Figure 6:
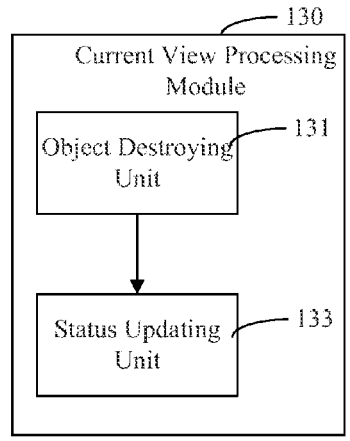
FIG. 6 illustrates a structure diagram of an exemplary current view processing module consistent with the disclosed embodiments.

FIG. 6 illustrates a structure diagram of an exemplary current view processing module consistent with the disclosed embodiments. As shown in FIG. 6, the current view processing module may include an object destroying unit 131 and a status updating unit 133.

The object destroying unit 131 is configured to destroy a view object corresponding to a current view by a view controller class, and status information corresponding to the destroyed view object is stored, removing the current view from an application interface.

The object destroying unit 131 obtains the status information corresponding to the view object of the current view through the view controller class. Further, when the view object of the current view is destroyed, the obtained status information is stored. The status information corresponding to the view object is used to indicate the display status of the current view in the application interface. For example, the status information corresponding to the view object includes the lateral offset and vertical offset of the current view, display status of various controls in the current view, and so on.

During the subsequent view switching process, when a user wants to jump back to the current view, the display status before switching can be restored through the stored status information corresponding to the view object of the current view. Therefore, the user may continue to see the current view smoothly, reducing the initialization process of the view and improving the view switching speed.

The status updating unit 133 is configured to update a view information tree with the status information corresponding to the destroyed view object.

The view information tree is a multi-way tree constructed based on the data corresponding to the view in the application interface, where every leaf node of the view information tree correspondingly stores the status information corresponding to a view.

The object destroying unit 131 updates the status information of the destroyed view object to the view information tree. During the view switching process, even if the view object corresponding to the view to be opened is not stored in the memory, the application/user can still jump back to the current view that he/she has left previously, achieving quickly jumping back and forth among the views. That is, the user jumps back to the interface corresponding to the previous view again. Therefore, the user does not need to manually search all opened views stored in the memory to locate the view to switch to again. The view switching method not only effectively reduces the memory consumption and improves application performance, but also speeds up the view switching speed.

Figure 7:
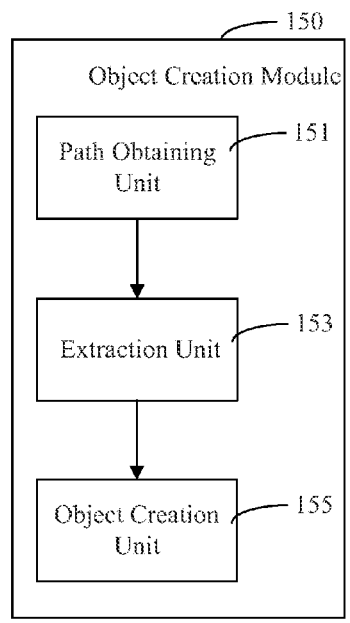
FIG. 7 illustrates a structure diagram of an exemplary object creation module consistent with the disclosed embodiments.

FIG. 7 illustrates a structure diagram of an exemplary object creation module consistent with the disclosed embodiments. As shown in FIG. 7, the object creation module may include a path obtaining unit 151, an extraction unit 153 and an object creation unit 155.

The path obtaining unit 151 is configured to obtain a target view identifier from a view switching operation by a view controller class and obtain a path of the target view in a view information tree based on the target view identifier.

After a view switching operation is triggered in an application interface, the path obtaining unit 151 calls the corresponding response interface (i.e., the view controller class). The target view identifier is obtained from a view switching operation by the view controller class, and based on the target view identifier, a path of the status information corresponding to the target view is obtained in a view information tree. A leaf node in the view information tree for storing the data corresponding to the target view can be obtained through the path.

Specifically, the view information tree includes a plurality of leaf nodes. Each leaf node corresponds to a view opened by the application interface, and each leaf node stores the status information corresponding to the view. The status information is used to indicate the display status of the corresponding view in the application interface. Each node of the view information tree has a corresponding indicator. The higher level indicator and the lower level indicator together may build the path from the root node to the corresponding leaf node.

After the target view identifier is obtained from the view switching operation by the view controller class, an indicator of the view information tree is opened, and then the branch path indicated by the indicator is obtained.

The extraction unit 153 is configured to, based on the path of the target view, extract the status information corresponding to the target view from the view information tree.

Specifically, according to the obtained path, the extraction unit 153 obtains the leaf node of the view information tree corresponding to the target view. Then, the status information corresponding to the target view is extracted from the obtained leaf node. The status information includes display status of the view object corresponding to the target view.

The object creation unit 155 is configured to create a view object corresponding to the target view by calling the view creation function in the view controller class along with the status information corresponding to the target view.

Because the view switching operation is triggered, the corresponding view object needs to be dynamically created for the view switching operation triggered on the application interface, where the view object corresponds to the target view of the view switching operation.

The object creation unit 155 calls the view creation function in the view controller class, and the status information corresponding to the target view is used as an input of the view creation function to dynamically create the view object.

Figure 8:
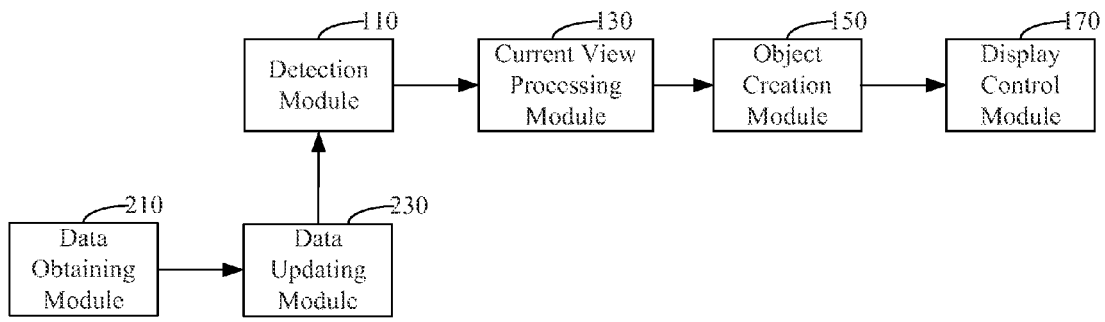
FIG. 8 illustrates a structure diagram of another exemplary apparatus for view switching consistent with the disclosed embodiments.

FIG. 8 illustrates a structure diagram of another exemplary apparatus for view switching consistent with the disclosed embodiments. As shown in FIG. 8, the apparatus may include a detecting module 110, a current view processing module 130, an object creation module 150, a display control module 170, a data obtaining module 210 and a data updating module 230. The descriptions for the detecting module 110, the current view processing module 130, the object creation module 150 and the display control module 170 may referring to the above descriptions in FIG. 5, which are not repeated here.

The data obtaining module 210 is configured to obtain data requested by the newly created view through a triggered operation that creates the new view.

When an application is triggered to create a new view, a data request is initiated by triggered creating-a-new-view operation to obtain the requested data.

Specifically, the data requested by the data obtaining module 210 is the backend data corresponding to the application, that is, the data issued by a server that interacts with the application. For example, if an application is a browser running on the electronic device, the view switching in the browser is switching between a plurality of webpages opened by the browser. At this time, the triggered operation that creates a new view is an operation that opens a new webpage in the browser. The data obtaining module 210 initiates a request to the corresponding backend server to obtain data returned from the backend server. The data is related to the webpage to be opened.

The data updating module 230 is configured to, based on the obtained data, update a view information tree, and record the status information of the newly created view in the view information tree.

Based on the obtained data, the data updating module 230 obtains the leaf node corresponding to this newly created view to locate the next higher level node of the view information tree. Based on the obtained data, the view information tree is updated to construct a new branch. Then, the leaf node of the new view is set at the newly constructed branch, and the status information of the new view is recorded in the new leaf node.

At this time, when the new view is switched to from the current view through the view switching operation of the application interface, the newly created view object is returned to a caller. The caller can be a view controller. The location and level of display of the view object is further configured by the view controller. Thus, the corresponding view is displayed after receiving the view switching operation in the application interface from the user.

In one embodiment, the above view information tree is dynamically constructed with view switching in the application interface.

In certain embodiments, this view information tree is constructed when the application interface opens a view at the first time. A new branch is dynamically constructed when a new view is created. An indicator of the path pointing to the corresponding leaf node is closed when the view is closed.

Thus, each new branch of the view information tree is constructed at different time. The branch is constructed only when the view on the branch needs to be displayed. Therefore, the view information tree is dynamically expanded based on the actual needs.

Those skilled in the art should understand that all or part of the steps in the above method may be executed by relevant hardware instructed by a program, and the program may be stored in a computer-readable storage medium such as a read only memory, a magnetic disk, a Compact Disc (CD), and so on.

The embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed method and apparatus for view switching, when a view switching operation in an application interface by a user to switch from a current view to a target view is detected, the current view corresponding to the view switching operation is destroyed. The current view displayed on the application interface is destroyed by a view controller class. The view object corresponding to the current view can also be destroyed, and the view object does not remain in the memory. The view object corresponding to the target view in the view switching operation is created by calling the view controller class. The view object is dynamically created by the view controller class. The view controller only needs to control the display of the view object, thus avoiding implementing complex logic associated with the view object in the view controller. The view switching method not only effectively reduces the memory consumption and improves application performance, but also speeds up the view switching speed.

What is claimed is:

1. A method for page view switching implemented by a terminal having at least a processor and a memory, comprising:
   detecting a view switching operation in an application interface by a user to switch from a current view to a target view, wherein a view in the application interface is displayed through a view object assigned values, wherein the view object is dynamically created and controlled by a view controller, and the view controller obtains data from a view information tree and assigns the values to the view object based on the obtained data, so as to display the view;
   destroying the current view corresponding to the view switching operation, including:
      storing status information corresponding to a first view object, the first view object being corresponded to the current view, wherein the status information is obtained from the view controller and includes a page position of the current view;
      updating the view information tree with the status information corresponding to the destroyed first view object, wherein the view information tree stores data of each view opened in the application interface and is stored separately from the view object; and
      destroying the first view object, wherein the first view object corresponding to an entirety of the current view is deleted from the memory;
   obtaining a path of the target view in the view information tree;
   based on the path of the target view, creating a second view object corresponding to the target view in the view switching operation by calling a view controller class;
   assigning second values to the second view object through the view controller; and
   displaying the second view object with the assigned second values on the application interface to display the target view to the user,
   wherein only a single view object is stored in the memory at a time, and wherein the single view object is the second view object corresponding to the target view when the target view is currently displayed in the application interface and the current view is opened and not currently displayed in the application interface.

2. The method according to claim 1, wherein creating the second view object corresponding to the target view in the view switching operation by calling a view controller class further includes:
   obtaining a target view identifier from the view switching operation by the view controller class;
   based on the target view identifier, obtaining the path of the target view in the view information tree;
   based on the path of the target view, extracting the status information corresponding to the target view from the view information tree; and
   creating the second view object corresponding to the target view by calling a view creation function in the view controller class along with the status information corresponding to the target view.

3. The method according to claim 1, further including:
   obtaining data requested by a newly created view through a triggered operation that creates the target view, wherein the target view is the newly created view that is not opened in the application interface prior to the triggered operation;

based on the obtained data, updating the view information tree; and recording the status information of the newly created view in the view information tree.

4. The method according to claim 3, wherein updating the view information tree further comprises:

based on the obtained data and hierarchical relationships in the view information tree, determining a parent node corresponding to the target view in the view information tree;

constructing, in the view information tree, a branch from the determined parent node; and setting, at the constructed branch of the view information tree, a leaf node corresponding to the target view.

5. The method according to claim 1, wherein:

the view information tree is dynamically constructed during view switching in the application interface.

6. The method according to claim 1, wherein assigning second values to the second view object and displaying the second view object with the assigned second values on the application interface further includes:

accessing, by the view controller, data corresponding to the target view from the view information tree, wherein the data corresponding to the target view is used to indicate relationships among different views, hierarchical relationships in the target view, and contents and pictures of the target view; and based on the data corresponding to the target view, assigning, by the view controller, the second values to the second view object to draw and display the target view on the application interface.

7. The method according to claim 6, wherein:

after the view switching operation is triggered, the target view is loaded to replace the current view displayed on the application interface; and the view controller is created to control the second view object corresponding to the loaded target view.

8. The method according to claim 1, wherein:

the view controller class is used to control creation and destroying of the first view object and the second view object.

9. The method according to claim 1, wherein:

a branch of the view information tree is dynamically constructed when the application interface receives a triggered operation to open and create a new view; and each leaf node of the view information tree corresponds to each view opened in the application interface.

10. The method according to claim 1, further comprising:

receiving an operation of closing one view opened in the application interface, and in response to the closing operation, closing, in the view information tree, a path pointing to a leaf node corresponding to the closed view.

11. The method according to claim 1, wherein:

the status information of each view opened in the application interface includes at least one of: a lateral offset of the corresponding view, a vertical offset of the corresponding view, or a display status of a control in the corresponding view.

12. The method according to claim 1, wherein:

when the target view is currently displayed in the application interface, the first view object is deleted from the memory, and the current view is opened but not displayed in the application interface.

13. An apparatus for page view switching, comprising at least one processor configured to:

detect a view switching operation in an application interface by a user to switch from a current view to a target view, wherein a view in the application interface is displayed through a view object assigned values, wherein the view object is dynamically created and controlled by a view controller, and the view controller obtains data from a view information tree and assigns the values to the view object based on the obtained data, so as to display the view;

destroy the current view corresponding to the view switching operation, including:

storing status information corresponding to a first view object, the first view object being corresponded to the current view, wherein the status information is obtained from the view controller and includes a page position of the current view;

updating the view information tree with the status information corresponding to the destroyed first view object, wherein the view information tree stores data of each view opened in the application interface and is stored separately from the view object; and destroying the first view object, wherein the first view object corresponding to an entirety of the current view is deleted from the memory;

obtain a path of the target view in the view information tree;

based on the path of the target view, create a second view object corresponding to the target view in the view switching operation by calling a view controller class;

assign second values to the second view object through the view controller; and display the second view object with the assigned second values on the application interface to display the target view to the user, wherein only a single view obiect is stored in the memory at a time, and wherein the single view obiect is the second view obiect corresponding to the target view when the target view is currently displayed in the application interface and the current view is opened and not currently displayed in the application interface.

14. The apparatus according to claim 13, wherein the at least one processor is further configured to:

obtain a target view identifier from the view switching operation by the view controller class and obtain the path of the target view in the view information tree based on the target view identifier;

based on the path of the target view, extract the status information corresponding to the target view from the view information tree; and create the second view object corresponding to the target view by calling a view creation function in the view controller class along with the status information corresponding to the target view.

15. The apparatus according to claim 13, wherein the at least one processor is further configured to:

obtain data requested through a triggered operation that creates the target view, wherein the target view is not opened in the application interface prior to the triggered operation; and based on the obtained data, update the view information tree and record the status information of the target view in the view information tree.

16. The apparatus according to claim 13, wherein:

the view information tree is dynamically constructed during view switching in the application interface.

17. The apparatus according to claim 13, wherein the at least one processor is further configured to:
- access data corresponding to the target view from the view information tree, wherein the data corresponding to the target view is used to indicate relationships among different views, hierarchical relationships in the target view, and contents and pictures of the target view; and
- based on the data corresponding to the target view, assign the second values to the second view object to draw and display the target view on the application interface.

18. The apparatus according to claim 17, wherein:
- after the view switching operation is triggered, the target view is loaded to replace the current view displayed on the application interface; and
- the view controller is created to control the second view object corresponding to the loaded target view.

19. The apparatus according to claim 13, wherein:
- the view controller class is used to control creation and destroying of the first view object and the second view object.

* * * * *